Patented Jan. 2, 1923.

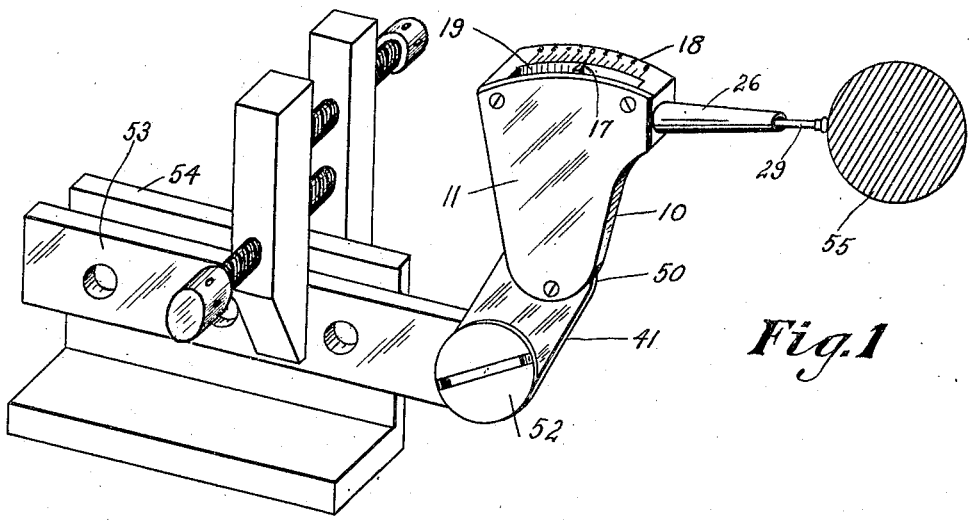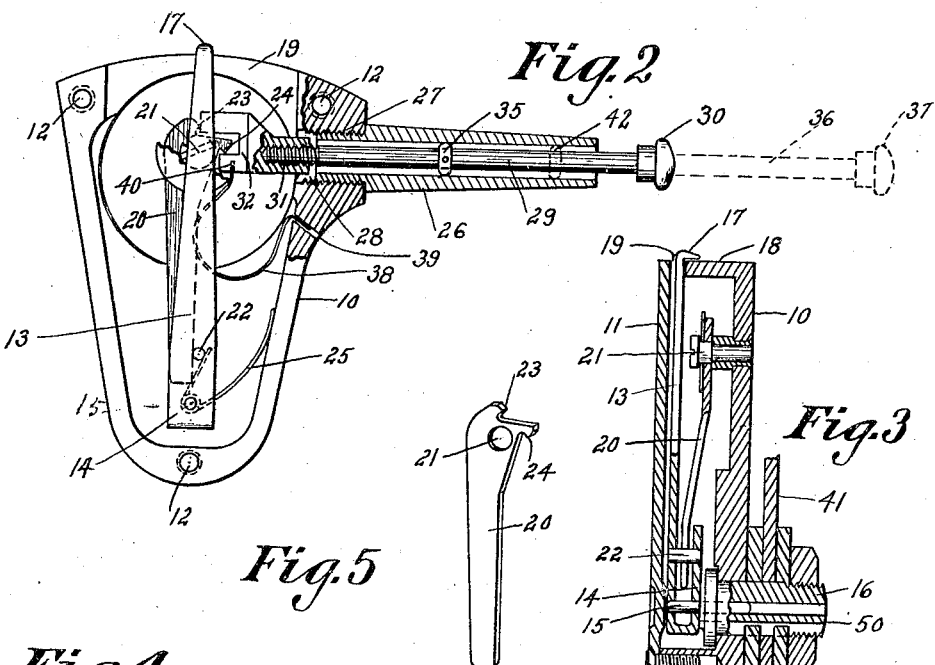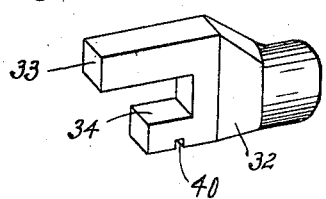

1,441,129

UNITED STATES PATENT OFFICE.

MILTON A. SMITH AND SYLVANUS W. BROWN, OF WOONSOCKET, RHODE ISLAND; SAID BROWN ASSIGNOR OF ALL HIS RIGHT TO CHARLES L. HALL, OF WOONSOCKET, RHODE ISLAND.

SURFACE INDICATOR.

Application filed October 18, 1919. Serial No. 331,577.

*To all whom it may concern:*

Be it known that we, MILTON A. SMITH and SYLVANUS W. BROWN, citizens of the United States, and residents of Woonsocket, in the county of Providence and State of Rhode Island, have invented certain new and useful Improvements in Surface Indicators, of which the following is a specification.

This invention relates to improvements in surface indicators; and has for its object to provide such a device which will indicate inaccuracies in the surface of work.

A further object of the invention is to provide a surface indicator whereby either a relative longitudinal or transverse movement of the free end of the feeler member of the indicator causes the degree of inaccuracy to be shown on a graduated surface. By this construction the device may be employed to indicate the inaccuracies or the amount the work is out of true either on its outer surface or on its inner surface, such as a hole or the like into which the feeler member may extend.

With these and other objects in view, the invention consists of certain novel features of construction, as will be more fully described, and particularly pointed out in the appended claims.

In the accompanying drawings:

Figure 1—is a perspective view illustrating our improved surface indicator positioned to engage the outer surface of a cylindrical piece of work.

Figure 2—is a side elevation of the instrument partly in section and with the side of the casing removed, showing the internal mechanism.

Figure 3—is a central vertical section of the device.

Figure 4—is a perspective view of the block which engages the motion multiplying lever.

Figure 5—is a perspective view of the motion multiplying lever.

Referring to the drawings, 10 designates the body portion of the indicator, which is preferably formed hollow with a cover 11 secured to one face thereof by screws 12. In this casing is mounted a pointer-arm 13, its lower end being bent into U-shape as at 14 and pivoted on the small pin 15 which is supported in the trunnion member 16. The upper end of this arm extends through a slot 19 in the casing and is turned at a right angle to the plane of the arm and pointed at 17 to reach over the graduated surface 18 of the body-portion.

A movement-multiplying lever 20 is pivoted at its upper end at 21 and is arranged to extend downwardly, its lower end engaging the pin 22 in the pointer-arm 13. The upper end of this lever is provided with two distinct knife edges 23 and 24 which serve as thrust bearings set to receive thrusts directed at right angles to each other. In other words, the edge 23 is to receive the longitudinal thrust of the feeler member, presently described, while the edge 24 is to receive the thrust of a transverse movement of the free end of the feeler member, either of which thrusts serves to move the pointer-arm over the graduated face of the indicator body through the motion of the movement-multiplying lever 20.

A spring 25 is provided to press the pointer-arm to the left of the graduated slot where it normally stays when the device is not in use.

A tubular nose-member 26 is threaded at 27 into the opening 28 in the body-portion and a feeler spindle 29 of a diameter less than that of the internal diameter of the nose-body, is mounted to extend through said nose-member; the outer end 30 of this spindle being provided with an enlargement and the inner end 31 is threaded into a block 32, which block is provided with an end thrust surface 33 which engages the knife edge 23 and an upper thrust surface 34 which engages the corresponding knife edge 24 of the movement-multiplying lever 20.

Midway between the thrust edge 24 and the outer edge of the enlargement 30 we have mounted a collar or enlargement 35 on the feeler spindle, the outer surface of the collar being rounded so as to permit a rocking motion of the spindle in the tubular nose.

In some instances when it is desired to obtain a long feeler member such as illustrated at 36, in dotted lines, it is only necessary to remove the shorter spindle and screw in the longer spindle the fulcrumed point of the latter being at 42 or exactly midway between the knife edge 24 and the edge 37 of this elongated spindle by which construction the change in the length of the feeler does not change the proportional motion of the feeler and pointer. In order to hold the spindle engaging block 32 and the spindle back in position normally in contact with the knife edges 23 and 24, we have provided a light spring 38, one end of which engages an opening 39 in the casing while the other end engages a slot 40 in the under side of the block.

Surface indicators of this character are usually mounted rigidly upon a supporting bar, but it is found in practice to be of advantage to adjust the body of the indicator relative to this supporting bar. Therefore we have provided a link-member 41 which is pivoted at one end 50 to the body of the indicator and at its opposite end 52 to the supporting-bar 53 whereby the bar may be rigidly secured to a face-plate 54 or held in the usual tool post (not shown).

In setting the indicator the bar 53 is mounted in its holder and the feeler 29 is positioned against the work 55 with sufficient pressure to bring the pointer 17 to zero in the center of its slot as illustrated in Figure 1. Any protuberance on the surface of the work beyond this point will move the pointer in one direction while a depression will move the pointer in the opposite direction. In other words as the surface of the work advances in contact with the feeler the extent of the inaccuracies is indicated by the pointer moving over the graduated surface.

By our improved construction the body of the indicator may be moved back and forth relative to the work 55 without the necessity of adjusting the bar or the member to which the bar is attached.

The device is extremely simple and practical in its construction and efficient in its operation.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. A surface truing indicator having a graduated scale, a pointer to cooperate with the scale, a feeler member having a longitudinal movement and a transverse movement, means to receive the thrust from the longitudinal movement of the feeler, and other means for receiving the transverse movement of the feeler, both of said means transmitting the movement of the feeler to move the pointer proportionately over said graduated scale.

2. A surface truing indicator comprising a body portion having a graduated scale, a pointer to cooperate with said scale, a feeler member mounted in said body having a longitudinal movement and a transverse movement, a movement-multiplying lever mounted in said body and having means to receive the thrust from the longitudinal movement of the feeler and having other means to receive the thrust from the transverse movement of the feeler, said lever being engageable with said pointer to move the same over the graduated scale proportionately to the movement of said feeler.

3. A surface truing indicator as set forth in claim 2, further characterized by spring means normally urging the pointer to one position and maintaining the pointer and said lever in contact, and other spring means for yieldably maintaining the feeler and said thrust receiving means in contact.

4. A surface truing indicator comprising a body member having a graduated scale thereon, a pivoted pointer mounted in the body member to cooperate with said scale, a lever pivoted within the body and having its distal end adapted to engage the pointer, a slidable member mounted to engage the lever adjacent its pivoted end to move the lever on its pivot, and a feeler member detachably connected to said slidable member, said feeler member being mounted in the body to have a longitudinal sliding movement and a transverse rocking movement which is transmitted to said pointer through said slidable member and said lever.

5. A surface indicator comprising a body having a graduated scale thereon, a pointer, a movement-multiplying lever mounted in said body said lever being provided with two distinct thrust points set to receive thrusts directed at right angles to each other, a feeler spindle operatively mounted to engage either of said thrust points of said lever to move said pointer proportionally over said graduated scale.

6. A surface truing indicator as set forth in claim 4 further characterized by the lever having independent means for receiving the thrust of the longitudinal movement and the thrust of the transverse movement of the feeler and said slidable member having independent means engageable with the independent means of said lever, and means for yieldably maintaining said slidable member in contact with said means on the lever.

7. A surface indicator comprising a body member having a graduated scale thereon, a pointer to cooperate with said scale and carried by said body member, a feeler mounted on said body having a longitudinal movement and a transverse movement, a movement multiplying lever mounted on said body and having a means to receive the thrust from said longitudinal and other means to receive the transverse movements of the feeler, and means between said lever and pointer for transmitting the movement of said feeler to said pointer.

8. A surface indicator comprising a body member having a graduated scale thereon, a pointer having one end portion pivotally mounted to said body member, a lever having one end portion pivotally mounted to said body member and having its distal end engageable with said pointer adjacent its pivoted end, yieldable means normally maintaining said pointer and said lever in engagement, a feeler element slidably mounted in the body member and having means thereon for permitting it to have free oscillating movements transversely of said sliding movement thereon, yieldable means for maintaining a portion of said feeler in engagement with said lever at its pivoted end, and means between the said feeler and said lever for transmitting the movements of said feeler to said lever.

9. A surface indicator comprising a body member having a graduated scale thereon, a pointer having one end portion pivotally mounted to said body member, a lever having one end portion pivotally mounted to said body member and having its distal end engageable with said pointer adjacent its pivoted end, yieldable means normally maintaining said pointer and said lever in engagement, an elongated feeler element slidably mounted in a bore in said body member and of less diameter than said bore, an enlargement of said feeler intermediate its ends and in contact with said walls of the said bore, whereby the feeler will admit of free oscillating movements on said enlargement, yieldable means for maintaining a portion of said feeler in engagement with said lever at its pivoted end, and means between the said feeler and said lever for transmitting the movements of said feeler to said lever.

10. A surface indicator comprising a casing, a pointer having one end bent upon itself to a substantially U-shaped formation and having an indicating member on its other end, scale on said casing with which said indicator cooperates, a pivot pin extending through said first mentioned end of said pointer, a lever having one end pivoted in said casing and having its other end extending between said U-shaped portions of the pointer, a lug between said U-shaped end of said pointer and carried by the latter with which said lever engages, an elongated feeler mounted in said tubular bearing and having a longitudinal sliding movement and a transverse pivotal movement therein, means on the outer end of said feeler for engaging the work, projections on the inner end of said feeler for engaging the pivotal end of said lever, said lever having a surface thereon engageable by one of said projections on said feeler for receiving the transverse movement of the latter, yieldable means for maintaining said lever and pointer in engagement and the inner end of said feeler in engagement with the pivotal end of said lever.

11. A surface indicator comprising a body member having a graduated scale thereon, a pointer to cooperate with said scale and carried by said body member, a movement multiplying lever mounted on said body member, means between said lever and pointer for transmitting the movements of said lever to said pointer, a feeler mounted on said body member having a longitudinal movement and a transverse movement, and means to receive the thrusts from said longitudinal and transverse movements of the feeler for moving the lever in one direction by the transverse movements and in another direction by the longitudinal movements of said feeler, whereby the pointer is moved in different directions from a given point on the scale according to the movement of said feeler.

12. A surface indicator comprising a body member having a graduated scale thereon, a pointer mounted on the body member to cooperate with said scale, a lever mounted on the body member, means between said lever and pointer for transmitting the movements of said lever to the pointer, a feeler mounted on the body member and having a longitudinal movement and a transverse movement, means on the feeler for engaging the lever and actuating the lever in one direction when the feeler moves longitudinally, other means on the feeler for engaging the lever and actuating the lever in another direction when the feeler moves transversely, and means on the feeler for engaging the work, said pointer being adapted to be moved to an intermediate setting position on the scale when the feeler is in operative contact with the work.

13. A surface indicator comprising a body member having a graduated face, an indicating pointer cooperating with said face, a feeler rod having an enlarged fulcrum point intermediate its ends dividing it proportionally, an elongated fulcrum bearing member on the body on which the enlargement is adapted to rock or slide, pointer operating mechanism connecting said feeler and said pointer to operate the latter when the feeler is either moved longitudinally or rocked on its fulcrum, and means for removably connecting the feeler rod to the pointer operating mechanism whereby similar feeler rods of different operating lengths may be employed.

14. A surface indicator comprising a body member having a graduated face, an indicating pointer cooperating with said face, interchangeable feeler rods of different lengths each having an enlarged fulcrum point intermediate its ends dividing the rod proportionally, such proportional division of different rods being the same, an elongated fulcrum bearing tube fixed to said body in which one of said rods may be selectively mounted and in which the enlargement of said rod is adapted to either rock or slide, pointer operating mechanism connecting said feeler rod and said pointer to operate the latter when the feeler is moved longitudinally or rocked on its fulcrum, and means for removably connecting the feeler rod to the pointer operating mechanism whereby rods of different operating lengths may be selectively employed, without changing the proportional motion of said feeler and pointer.

In testimony whereof we affix our signatures in presence of two witnesses.

MILTON A. SMITH.
SYLVANUS W. BROWN.

Witnesses:
EDWARD F. GODDARD,
EMERY P. LEWIS.